(Model.)

W. W. BURSON.
GRAIN BINDER.

No. 273,811. Patented Mar. 13, 1883.

Witnesses:
O. F. Steward
John B. Kaspar

Inventor:
William W. Burson

(Model.)

W. W. BURSON.
GRAIN BINDER.

No. 273,811. Patented Mar. 13, 1883.

Witnesses:
J. F. Steward
John B. Kaspari

Inventor:
William W. Burson

(Model.)

W. W. BURSON.
GRAIN BINDER.

No. 273,811.

Patented Mar. 13, 1883.

Witnesses:
J. F. Steward
John B. Kaspari

Inventor:
William W. Burson

N. PETERS. Photo-Lithographer, Washington, D. C.

(Model.) 6 Sheets—Sheet 4.
W. W. BURSON.
GRAIN BINDER.

No. 273,811. Patented Mar. 13, 1883.

Witnesses:
W. J. Lukens
John B. Kaspari

Inventor:
William W. Burson

(Model.)

W. W. BURSON.
GRAIN BINDER.

No. 273,811.　　　　　　　　　　Patented Mar. 13, 1883.

Witnesses:
W. J. Lukens
John B. Kaspari

Inventor:
William W. Burson

(Model.)

W. W. BURSON.
GRAIN BINDER.

No. 273,811. Patented Mar. 13, 1883.

Witnesses:
Sidney P. Hollingsworth
Harry Shipley

Inventor:
W. W. Burson
By P. F. Steward his Atty.

UNITED STATES PATENT OFFICE.

WILLIAM W. BURSON, OF ROCKFORD, ILLINOIS.

GRAIN-BINDER.

SPECIFICATION forming part of Letters Patent No. 273,811, dated March 13, 1883.

Application filed April 5, 1882. (Model.)

*To all whom it may concern:*

Be it known that I, WILLIAM W. BURSON, of Rockford, in the county of Winnebago and State of Illinois, have invented certain new and useful Improvements in Grain-Binders, of which the following is a specification, reference being had to the accompanying drawings, in which—

Figs. 16, 17, and 18 are end views of the knotting, cutting, and holding devices, a portion of the end of the frame being removed. In Fig. 16 the knotter is shown in its position of rest, or that for receiving the twine to be operated upon. Fig. 19 shows the knotter as just started in its reverse rotation when it has carried the bow (if not already escaped from the barb) against the end of the flange $g$, which enforces its discharge. Fig. 20 shows a modified form of a section of the cord-holding plate and flange.

In the drawings, A is a frame supporting and forming bearings for the driving-shaft B and needle-shaft C, and is placed on the harvester or reaper in the usual position, so that the grain to be bound may be brought within reach of the needle. Upon shaft B are shown the driving-gear D, the knotter-frame E, the knotter-operating wheel F, and the supports for the discharge-arms L L'. The needle G is fastened to one end of the shaft C, which has the crank H upon its other end. The pitman I connects the crank H with driving-wheel D by the wrist-pin D'.

E is the frame for supporting the knotter, holder, and cutter.

E' is a cap for the bearing formed in frame E, which frame carries the shaft $d$, and has also formed thereon the flange concentric with the knotter, which forms a recess or cavity for the knotter $a$.

J is a portion of the binder-frame.

K is the slotted breast-plate. Its upper end is fastened to frame-piece J and its lower end to the knotter-frame E, Fig. 1.

L and L' are arms for discharging the bound sheaf by the revolution of shaft B.

The knotting-hook $a$ is provided with a barb, $a'$, and swinging latch $a^2$. This knotter is preferably cast integral with its driving-pinion $b$. I prefer to have a slide or delay-surface, $b'$, on this pinion; but it can be placed upon the reversing-pinion $b^2$. The knotter, with its pinion $b$, is secured to the shaft $c$, upon the other end of which is the reversing-pinion $b^2$. The shaft $d$ is here shown hollow to form a bearing for the shaft $c$, and has the curved arm $d'$ extending from its lower end, which arm forms a support for the cord-holder $e$ and the knife $f$. The flange $e'$ is cast integral with the frame E and forms the stationary part of the cord-holder, and in it is the notch $e^3$, forming a notch for the twine. The curved flange $g$ is cast integral with the frame E, and projects from the face of said frame-piece. It is made concentric with the axis of hook $a$, and forms a surface against which the barb $a'$ may press and hold the ends of the cord in the process of tying the knot. The flange surrounds the knotter to as great an extent, beginning with the notch $g'$, as it is desirable to hold its bow in the process of drawing it through the loop. It should not extend so far that the bow would fail to be carried fully beyond it and out of its influence in the retrograde rotation, thereby releasing the bow still on the barb from pressure against the concave. The first act in the second forward rotation is to carry the bow (if not already free) against this end of the concave and brush it off from the barb. The stripping-hook $h$, Figs. 16 to 19, serves to arrest the loop formed around the neck of the knotter $a$ from being carried back by the reverse movement of the knotter, and thereby permits the barb to draw the ends through the loop to form the knot.

It will be readily understood that the devices here shown and described can be used in many different positions and situations and combined in various manners in grain-binding machines, so that I do not wish to confine myself to the exact relation of the parts here shown, and, further, that packers, sheaf-sizers, compressors, and adjusters can be used in connection with these devices when desired. As I do not in this invention claim those parts, and their operation is well understood by those versed in this art, they are omitted in this description.

In operation motion is given to the driving-wheel D by connecting it in any convenient manner with the operating parts of the reaper.

Figures 1, 2:
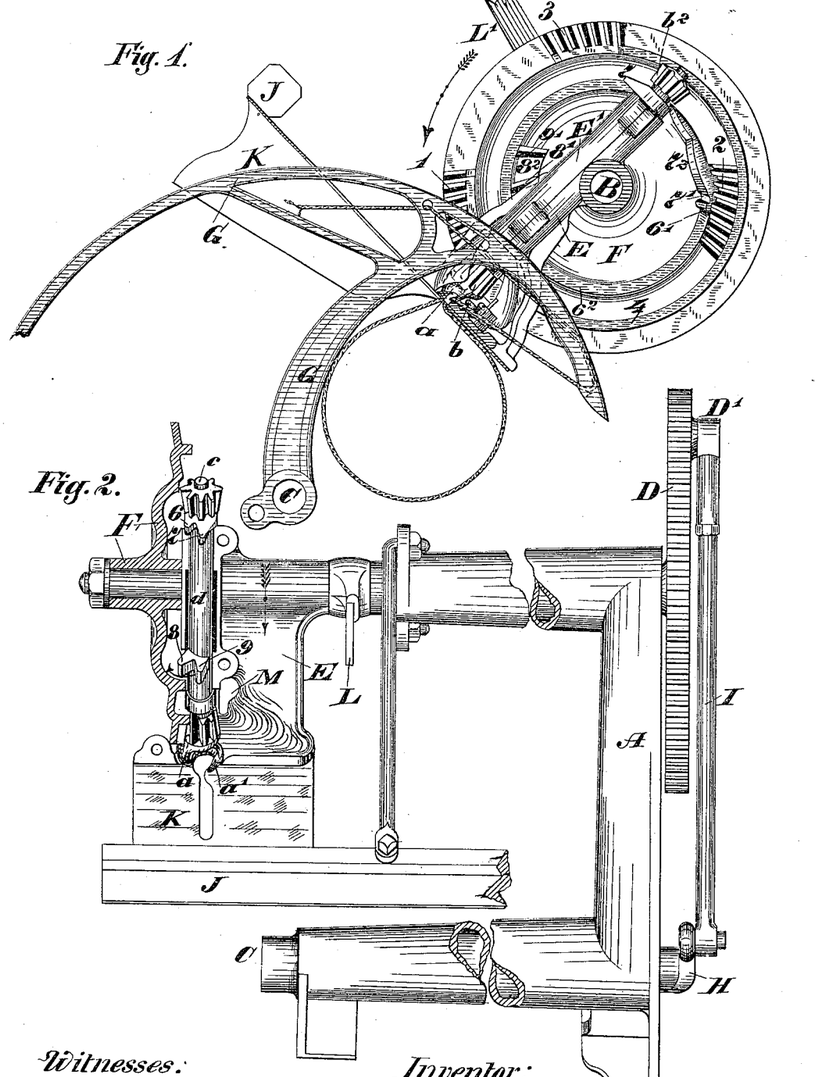
Figure 1 is a sectional elevation of the parts in position to begin tying the knot.
Fig. 2 is a plan view with the needle removed.
Figure 3:
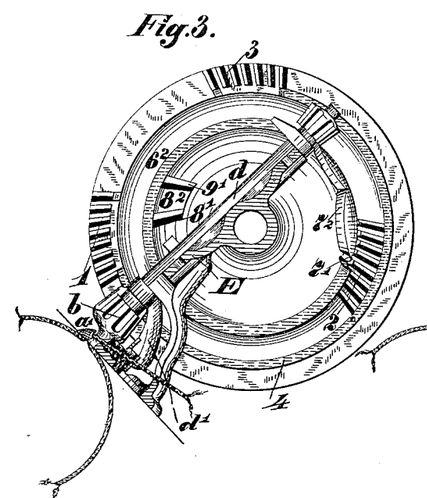
Figs. 3, 4, 5, 6, 7, and 8 show the knotting devices in different positions assumed in tying the knot, cutting the cord, and securing the end.
Figure 4:
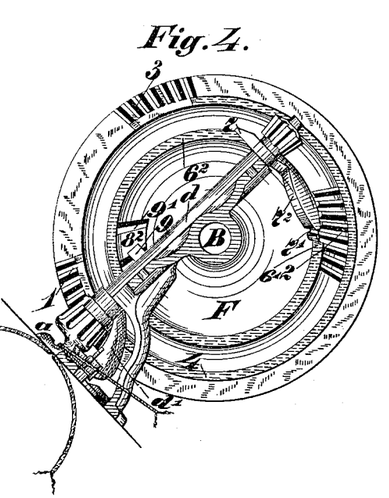
Figure 5:
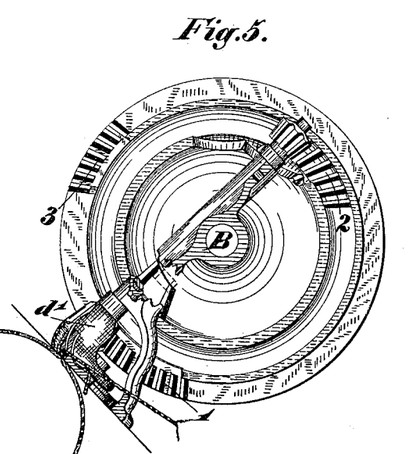
Figure 6:
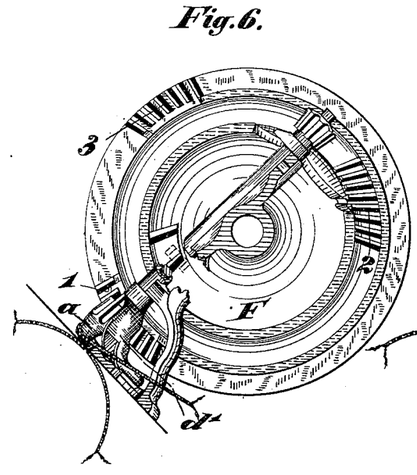
Figure 7:
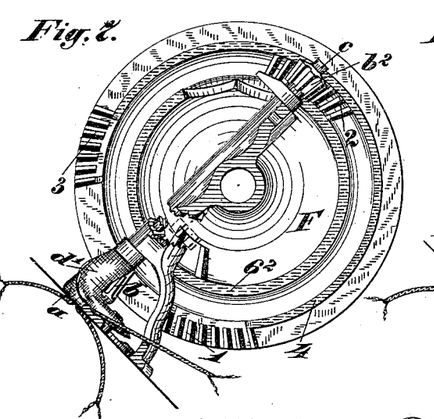
Figure 8:
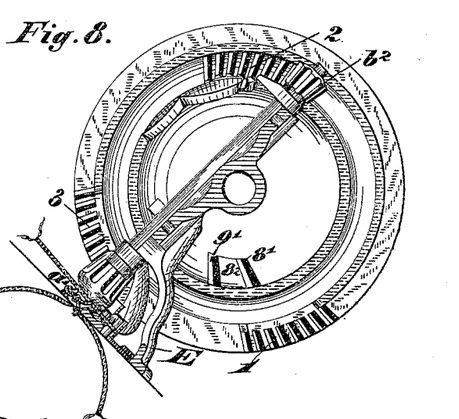
Figure 9:
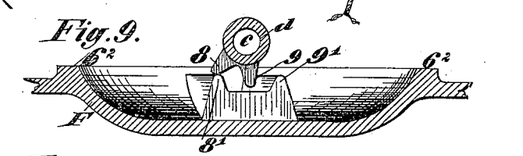
Figs. 9, 10, and 11 are sectional views of the means employed for operating the knotting, cutting, and holding devices.
Figures 10, 11, 12:
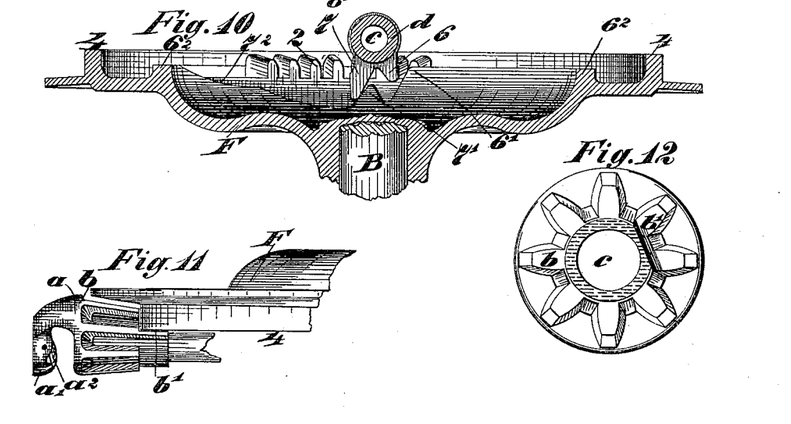
Fig. 12 is an end view of pinion $b$, with delay-surface $b'$.
Figures 13, 14, 15:
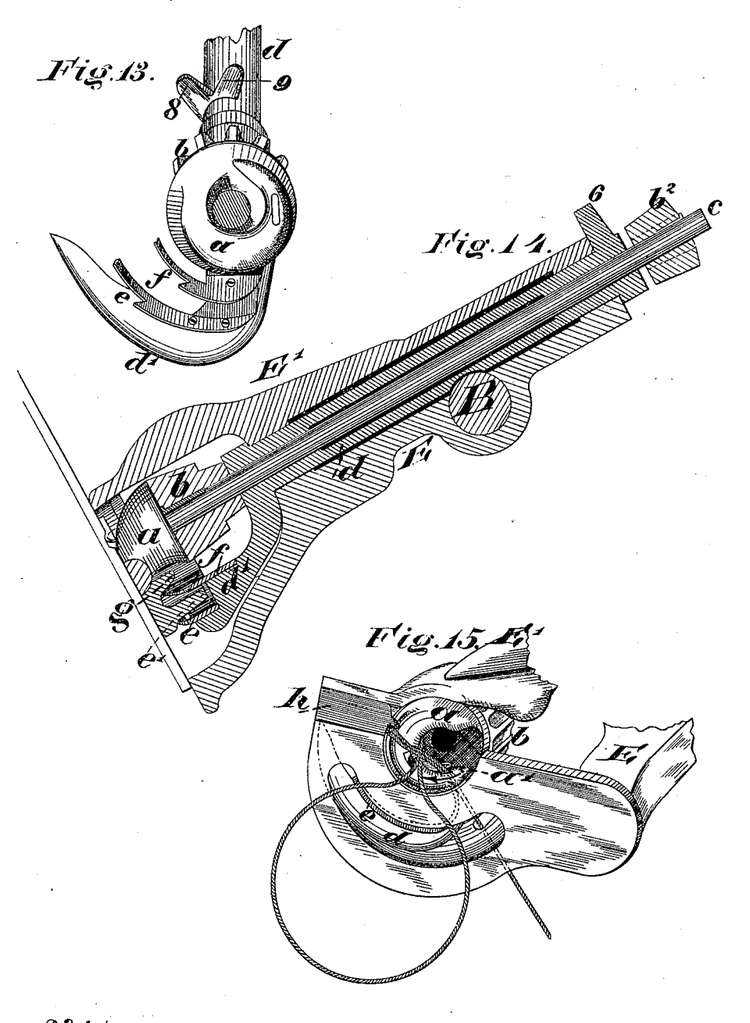
Fig. 13 shows the knotter, holder, and knife.
Fig. 14 is a sectional view of the knotter-frame, cord-holder shaft, and the knotter-shaft and pinions.
Fig. 15 is a perspective view of the knotter, stripper, and a portion of the frame.

As the cord is grasped by the cord-holder in the same operation by which the knot is tied, I shall begin my description with the end of the cord in the cord-holder and the gavel encircled by the cord which is laid in the knotter and the parts ready to begin tying the knot, as in Fig. 1. Beginning with the parts in this position, the operation is as follows: The rotation of wheel D, and with it wheel F, in the direction of the arrow, Fig. 1, brings the segment 1 of said wheel into mesh with pinion $b$, which turns the knotter in the direction of the arrows in Figs. 2 and 16, so as to carry its point forward and over the two ends of the band brought within its reach, one end being held by the needle and the other by the holder and across the slot in the breastplate, so as to operate to retain the cords within the knotting mechanism during the process of tying the knot. When the knotter, in its forward rotation, has reached the position shown in Figs. 4 and 16, the neck of the hook draws on the cord held in the cord-holder, which is now operated to turn backward, so as to pay out what cord is needed to form the loop around the neck of the knotter. The completed action of the segment 1 upon pinion $b$ brings the knotter into the position shown in Figs. 5 and 18, which forms the loop around the neck of the knotter and carries the barb past the ends of the cord which are to be drawn through the loop to form the knot. At this time segment 2 engages pinion $b^2$, which reverses the movement of the knotter, the barb of which then seizes the ends of the cord to draw them through the loop, which is held from being carried back with the hook by the stripping-hook $h$. At this time the cord-holder is given a further backward movement, which releases the end it was holding, and by an immediately succeeding forward movement takes a new hold of the cord which is held by the needle, and immediately following, the cord is cut by the knife $f$, permitting the knot to be completed and the sheaf discharged by the action of the arms L L'. These movements will now be more fully described.

It will be seen that no especial mechanism, in addition to the needle, is required to place the cord into the knotting mechanism. The position in which the knotter is placed in relation to the cord extending from the eye of the needle around the sheaf causes the cord to be carried well into the knotter, which, in connection with the slot in the breastplate and the curved shape of the knotter, insures the engaging and retaining of the cord when brought within the radial reach of the end of the knotter without the assistance of any additional devices. The rotation of the hook forms a loop around the neck of the knotting-hook back of the swinging latch, and still further movement of the knotter carries the barb well past the cords which are to be drawn through the loop to form the knot. The knotter, by means of its beveled end, in its forward movement, forces the ends of the cord which are in the notch $g'$ out of the path of the barb, and the strain upon the cord brings it back immediately, when the barb has passed, into the notch. When segment 1 has passed pinion $b$ the knotter will have made its farthest forward movement, and segment 2 will engage with pinion $b^2$, whereby the movement of the knotter is reversed. Segment 2 is located on the wheel F, on a concentric circle inside of that partially occupied by segment 1, which construction permits the use of two perfect pinions on the knotter-shaft to give the knotter forward and backward motion by the continued rotation of the driving-wheel in one direction. When the knotter is reversed the barb engages the cords in the notch $g'$, and after the knife has operated presses them firmly between the flange $g$ and the periphery of the knotter, holding them securely while carrying them through the loop to form the knot. The reversed movement of the knotter carries the loop formed around its neck back with it until it reaches the stripping-hook $h$, where it is arrested and the ends carried through, forming the knot. Since the loop is formed back of the swinging latch, the action of the loop will be to close the latch over the barb, thereby holding the ends of the cord in the barb and enabling the loop to be easily shed over them. Were the flange close-fitting entirely around the knotter, except the opening to admit the cord, the loop could not shed over the ends held by the barb. To remove this defect the recess $g^2$ is made in the flange near the stripping-hook, which enables the loop to shed over the latch and barb and the ends of the cord held therein. Then by its further movement the barb strikes the flange again, and thus holds the twines that form the bow securely, thereby drawing them farther through the loop and forming the knot closer to the sheaf than would otherwise be done.

I do not claim the flange $g$ as an indispensable element in my knotter, as a knot can be tied without it; but I do claim that it adds to the certainty of the process, as a short end of the cord, always liable to occur under heavy strain, will be held securely by the barb and flange, and thereby drawn through the loop and a perfect knot formed, which without the flange might have been lost and the knot fail to be tied, in addition to which the flange, extending beyond or to a point farther onward in the forward rotation of the knotter, holds the bow from escaping the barb and enables the latter to draw the ends of the cord farther through the loop, thereby leaving the knot closer to the sheaf, and of course tighter, than would otherwise be done. When the movement of the knotter is reversed it is necessary in some manner to arrest the loop formed about its neck from being carried back with it. To accomplish this result the stripping-hook $h$ is placed so that its point shall enter a groove formed in the end of the knotter somewhat inside its periphery, the better to permit its engagement with the loop to hold it while the barb draws the end through it. The periphery of the barb being concentric, and fitting as closely to the flange as the thickness of the twine carried by the said barb will permit, it is plain that some provision should be made to permit the loop to yield outward as the two strands of twine that are to form the bow are drawn through it. The recess $g^2$ is provided for this purpose, as shown in another application. This construction of the knotter is more favorable for forming the loop around its neck in such manner as to insure the stripping-hook engaging it in such manner as to remove it.

When the knot is tied, as just described, the ends are rarely drawn entirely through the loop, and hence there will be a bow-knot, and the bow will generally slip off the barb without further trouble, as its shape and position at the end of the movement given by segment 2 are favorable to such removal. To make certain the shedding of the bow of the knot from the barb of the knotter, the discharge-arms L and L′, the former of which is conveniently secured to a hub fixed upon shaft B, between the frame A and knotter-frame E, and the latter to the outer face of wheel F, are, by the rotation of said shaft, brought upon the sheaf at this time, and by pressure upon it will produce stress upon the band-twine, and hence upon the bow, and strip the latter from the barb, being assisted in this by the engagement of segment 3 of wheel F with pinion $b$, which, moving the knotter again forward, insures the shedding of the bow from the barb, when the continued rotation of the shaft B causes the discharge-arms to remove the sheaf and segment 3 to pass out of mesh with pinion $b$, which brings the knotter into its position of rest, the delay-surface $b'$ sliding upon the guide-rim 4, holding it in that position until the further rotation of wheel F brings segment 1 into mesh again with pinion $b$, and the process of tying another knot begins.

Figures 16, 17, 18, 19, 20:
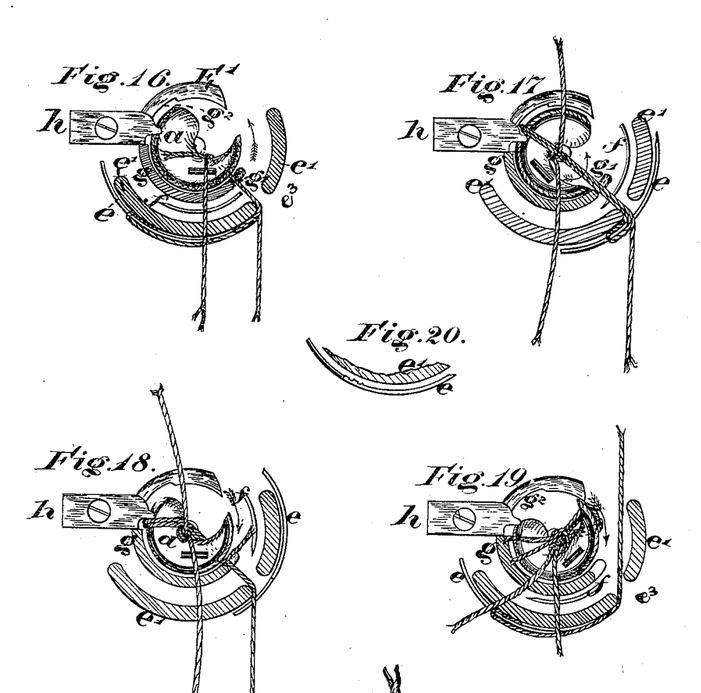
Figures 24, 25, 26, 27, 28, 29:
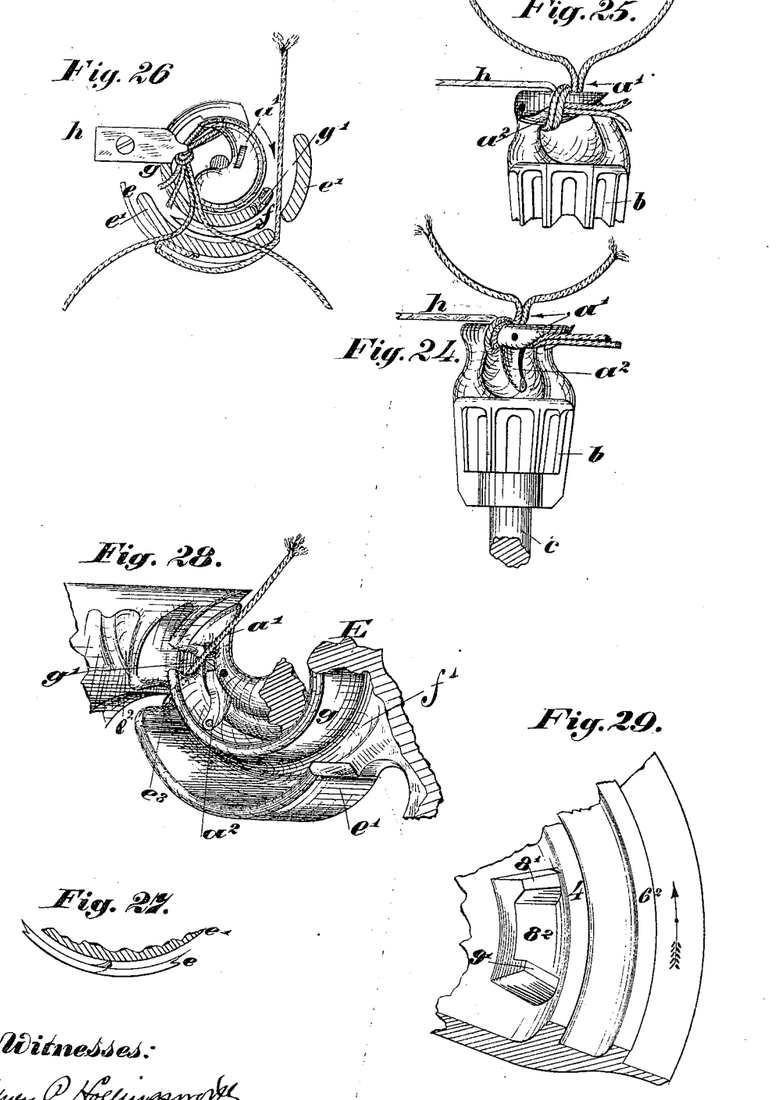
Fig. 24 shows the knotter $a$, with its barb $a'$, and the stripper $h$ in its proper relation thereto. The knot is here represented as laid and the knotter in the position of beginning the discharge of the same.
Fig. 25 shows the same parts, but the knotter is in a somewhat farther advanced position in its retrograde rotation and the loop as being shed over the barb and the latch, and hence over the bow between them.
Fig. 26 shows the knot as completed, the bow drawn through the loop, and the latter escaping from its engagement with the stripper.
Fig. 27 shows a modified form of the moving part of the cord-holder.
Fig. 28 is a perspective view of the frame so broken away as to expose the flange $e'$, with its notch, the flange $g$, forming the concave, with its notch $g'$, and the operating portion of the knotter $a$, with its barb $a'$ and latch $a^2$.
Fig. 29 is a form of the wheel shown in Fig. 22, in which the tooth $9'$ is farther removed from the tooth $8'$.

During the operations of the knotter just described the cord-holder and knife were making certain movements simultaneously therewith, which will now be described in their order and relation to the movements of the knotter. Some explanation of the construction of these parts will first be given, that their movements may be the better understood:

My cord-holder is composed of a stationary and a movable piece, sufficient length of each and movement of one being given to operate also as a paying-out device. In the stationary piece the surface coming in contact with the end of the cord is made smooth, and the apparent anomaly exists that the smoother it is the better it holds, at least in the paying-out process. That part of the movable piece which comes in contact with the cord is preferably either bent inward at the end, as shown in Fig. 27, or corrugated, as shown in Fig. 20, the object being that the cord shall press into and have more frictional resistance against the movable piece than upon the stationary part, to the end that the cord may be moved freely backward and forward without being released from between the two parts of the holder. In practical operation a return-bend is given to the cord over the end of the holder shown in Figs. 17 and 19, which adds greatly to the effectiveness of the devices.

In my present application the holding mechanism consists of the outer surface of the flange $e'$, made concentric with the axis of knotter $a$, and the plate $e$, secured to the arm $d'$ of shaft $d$. The plate $e$ is used only for convenience of construction, as the arm $d'$ could be so formed as to accomplish the same results. The shaft $d$ extends across the axis of wheel F, as already described for the shaft $e$, and receives its forward and backward movements from lugs or teeth engaging with like teeth on opposite sides of axis of said wheel. In this description it will be sufficient to note three positions of the holder: First, that of its extreme forward movement when it has drawn out sufficient length of cord to form the loop for the succeeding knot, as shown in Fig. 16; second, the position of its halt after paying out sufficient cord to form the loop of the knot, as in Fig. 17; and, third, the extreme backward movement, whereby the held end is released and the cord is in position to be re-engaged and cut and held for the next knot, as in Fig. 18. The knife $f$ is secured to arm $d'$ and moves with the holder. Its edge stands somewhat back of the end of the holder, so that it shall cut the cord after it is engaged securely by the holder, which moves so far forward as to take up sufficient length of cord to form the loop of the next knot, as in Fig. 19.

Figure 21:
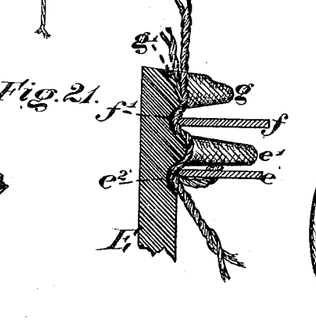
Fig. 21 is a sectional view of the holder, knife, and frame, showing their action upon the twine.

The movements of the cord-holder and knife and their operating parts are as follows: The cord-holder is kept in its first position, which may also be called its position of "rest," by the tooth or lug 6 moving upon the guide-rim $6^2$, which prevents the cord from drawing the holder back, and its construction does not admit of it moving farther forward. When the knotter, rotated by wheel F, has reached the position shown in Figs. 4 and 16, and requires cord to be paid out to form the loop around its neck, tooth 8 is engaged by tooth $8'$ of wheel F, which turns the holder to its position of half-movement, which pays out enough cord to form the loop, and must there await the further forward movement of the knotter and its return movement to engage both cords—namely, the needle-cord (that passing through the eye of the needle) and the end previously severed and then held, which up to this time the holder has retained, but which is immediately fully released. The holder comes to the halt just described by the teeth which made the movement passing out of engagement. The tooth 8, after passing out of engagement with tooth $8'$, drags on the delay-surface $8^2$ and prevents the shaft and holder making a return movement, while tooth 7 on the other end of the shaft $d$ also drags on the delay-surface $7^2$, and thus prevents the holder from going farther forward, in which manner it is locked until the knotter has secured the cords which are to be drawn through the loop, as before described, when tooth 9 of shaft $d$ is engaged by tooth $9'$ of wheel F, which turns the holder back to its third position, thereby releasing the end it had held up to the beginning of this movement, and being carried, together with the knife, beyond the uncut cord, engages it, when tooth 7 upon the outer end of shaft $d$ meets tooth $7'$ on the other side of the axis of wheel F, which turns said shaft in the opposite direction and brings the cord-holder $e$, with the engaged cord, against the flange $e'$, thereby holding it secure, while the knife, moving a little behind the advanced movement of the holder, cuts the cord, drawn tightly by knotter $a$ and holder $e$, arrested by the ends of the flanges $g$ and $e'$ in the space between said flanges, when the action of tooth $6'$ of wheel F upon tooth 6 of shaft $d$ brings the holder, with the end of the cord securely held, to its position of rest. When the cord-holder, in its paying-out movement, crosses the cord extending from the eye of the needle to the knotter the side of the holder-plate, as also of the knife, presses the cords into the grooves $f'$ $e^2$, Figs. 21 and 28, and thereby gives an additional security for holding the end of the cord if from any cause it should be released from the holder proper. These grooves also render the engagement of the holder and knife with the cord certain, as their ends are in the groove, and the cord drawn over the raised sides of the groove can never escape around the edge of the holder or knife. Since the cord rests in notches in the flanges $g$ and $e'$ and the backward movement of the holder and knife is entirely beyond the line of said notches, it is evident that the cord cannot be carried back under the side of the holder, and thereby fail to be engaged in its forward movement. It will be seen that the knot is tied, so nearly as may be done, on the dead-point of the needle's movement. Since the needle must have nearly completed its farthest forward movement before the knotter should be started, in order that the cord may be certainly placed within its grasp, the knot cannot be tied before the needle is partly retracted. This backward movement would prevent the cord-holder from taking hold of the cord unless some means were used to assist it. This result is favorably reached by the shape of arm $d'$ and the movement given it, whereby it is thrown over the cord while drawn tight by the paying-out movement, and thus held securely without regard to the withdrawal of the needle.

It is desirable to have the needle-eye pass as near to the knotter as possible, the better to facilitate the placing of the cord within its grasp. For this purpose the construction of the holder-arm $d'$ and the movements given it are such that it shall be out of the way of the needle when bringing the cord into the knotter, and the shape of the needle is such and the movements of the holder are so made that it can pass into and again out of the path of the needle-point before the needle shall have been so far retracted as to interfere with it. The cord-holder is kept in its position of rest by tooth 6, sliding upon guide-rim $6^2$ of wheel F. With a view of rendering these parts cheap, simple, and compact, the shaft $d$ is made hollow, and thus a bearing is formed for shaft $c$, by which construction the bearings for shaft $d$ in frame E serve as bearings for both shafts, with independent movements. Further, it is an indispensable condition to the successful operation of the cord-holder and knife that their movements shall be properly timed. This result is reached by casting integral with one another shaft $d$, arm $d'$, and the driving-teeth on said shaft, whereby cheapness of construction is secured, and no possible error can occur, either in the timing of the parts when made, or by their working loose and changing by practical use and wear in the field. It is, further, a necessity to the successful working of these devices that the relative movements of the knotter and holder be properly timed and their relations maintained. This is secured with certainty by casting the driving-teeth and delay or guide rims upon wheel F for both shafts c and d. Frame E is radially supported on shaft B, being further held in place by the breastplate K. Since wheel F is supported on shaft B, it is evident that shaft d must cross the disk of said wheel in order that a reversed motion of said shaft may be obtained, as hereinbefore described. This manner of obtaining the reversed movements of shafts c and d is preferred to that of having two disks, one on either side of the shafts, and operating by alternate segments or teeth to give the movements desired, as shown in another application. Frame E gives a bearing for shaft d, and also for the stripping-hook h. It has also the flanges g and e' and the grooves f' and $e^2$ cast integral with it, the uses of which have been explained. The slot M in frame E admits the passage of the end of the needle through the frame, and also serves as a guide for the cord back of the cord-holder when said holder is given its backward or paying-out movement. The needle is returned to its position of rest under the passage of the unbound grain by the action of wheel D through pitman I and crank H, which gives the needle its necessary oscillating movement. When the needle has been thrown back, as just described, the cord, guided by slot M in frame E and the slot in the breastplate, is landed with certainty within reach of the knotter, and the cord is thus given a return-bend over the end of the holder, a further bend over the end of the notch in the flange e', and in the knotter a still further bend when the sheaf is formed, which several belaying-bends in the cord reduce the strain capable of being brought upon the end held between the parts of the holder to a very small amount compared with that which is applied to the cord around the sheaf.

Figure 22:
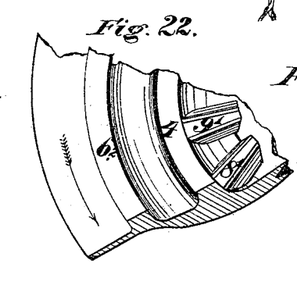
Fig. 22 is introduced to show a modified form of the teeth of the wheel F for moving the holder to pay out and to finally release the end of the twine.
Figure 23:
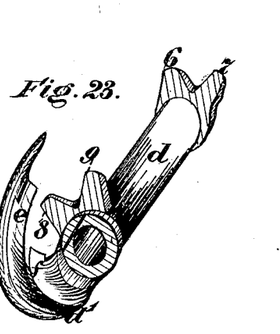
Fig. 23 shows the holder complete, with the teeth on the sleeve.

In a knotter having a barb which draws the ends of the cord through the loop, one of the difficulties to overcome is to have the bow of the knot discharged from the barb at the proper time. In practice I find that only about one-quarter of a revolution of the knotter is required, in its second forward rotation, to disengage the bow of the knot from the barb. This movement is obtained by the action of two teeth of segment 3. The knotter can now be returned to its position of rest, either by a segment of proper length engaging the reversing-pinion $b^2$, or by adding five additional teeth in segment 3, and thereby continuing the forward rotation of the knotter to its position of rest. I much prefer the latter plan, and have adopted it in my present application. The length of the pause between the paying-out movement and the releasing movement of the holder being subject to very many conditions, it may need to be varied to meet any change in the timing of the knotter, or any other condition that may vary the stress upon the twine in tying the knot. Hence it may sometimes be necessary to vary the positions of the teeth 8' and 9' upon the wheel F, as relatively to each other. If the teeth are as close together as in Fig. 22, slight pause will be given. If as in Fig. 29, a greater delay will be given.

What I claim as my invention is—

1. In a grain-binder, the slotted breastplate, the flange e', having the notch $e^3$, and the slotted knotter-frame, the whole for guiding the twine to the knotter, in combination with the needle, substantially as described.

2. The slotted breastplate, the flange e', having the notch $e^3$, the slotted knotter-frame, and the holder-arm d', the whole for guiding and holding the twine to the knotter, combined with the needle, substantially as described.

3. The combination, with the rotary reciprocating knotter, of the circular flange, extending partially around the knotter, as described, so that its end will insure the stripping of the bow from the barb of the knotter as the knotter is rotated forward to its position of rest, substantially as described.

4. The combination of the knotter a, shaft c, pinions b and $b^2$, delay-surface b', with a wheel having segments 1 and 2 and guide-rim 4, the whole constructed substantially as described.

5. The combination of the knotter, operating to tie the knot by a forward and reverse rotation and discharge the bow from the barb by a second forward rotation, with an operating-wheel having the segments 1, 2, and 3, constructed and operating substantially as described.

6. The combination of the oscillating knotter, provided with a barb for engaging the ends of the cord, with the circular flange having the notch g' for receiving and retaining the cord in proper position to be engaged by said barb, substantially as set forth.

7. The combination, with the knotter, operating to complete the knot by a reversed movement on its axis, and having the concentric groove in its face, of the fixed stripping-hook, its point directed into the groove and adapted to permit the cord to pass it when the knotter is revolving forward to form the loop, but to engage and operate to strip the loop when the knotter is reversed, substantially as set forth.

8. The combination, with a knotter having a barb and operating to complete the knot by a reverse rotation, of a stripper operating to retain the loop while the ends of the cord are drawn through it, and a curved flange provided with the recess $g^2$, substantially as described.

9. The circular oscillating cord-holder, constructed substantially as described, combined with operating means to engage the cord and carry its end along the circular flange of the holder in its forward oscillation, and to draw the end of the twine with it in its return movement to pay out, substantially as set forth.

10. In a grain-binder, the shaft d, provided with the arm d', and the teeth 8 9 and 6 7, cast in one piece, for the purpose set forth.

11. In a grain-binder, the shaft d, constructed so as to form a bearing for the knotter-shaft, and provided with the arm $d'$ and teeth 8 9 and 6 7, for the purpose set forth.

12. In a grain-binder, the combination, with a knotter and holder, of a knotter and holder frame, constructed so as to form a bearing for the holder-shaft, and having the flange $e'$ cast integral with the frame, substantially as and for the purpose set forth.

13. In a knotting mechanism, the combination, with a holder, of the circular groove $f'$ and corresponding shaped knife $f$, constructed and operating to form a resistance between the holder and the knotter, substantially as described.

14. In a grain-binder, the concentric grooves $f'$ and $e^2$, in combination with the knife $f$ and holder $e$, constructed and operating to form a resistance between the cutter and holder and the knotter, substantially as described.

15. The combination, with the needle, of the holder-arm $d'$, constructed as described, and operating in the paying-out movement of the holder to pass between the needle and cord and retain the latter in position to be grasped by the holder proper without regard to the position of the needle, substantially as set forth.

16. The combination of the cord-holder and knife, mounted upon arm $d'$ of shaft $d$, which is provided with the teeth 6 7 and 8 9, with their operating-gears, on the driving-wheel, substantially as specified.

17. The combination of the cord-holder, moved intermittently, the shaft provided with the teeth 6 7 and 8 9, and the driving-wheel provided with the teeth $6'$ $7'$ and $8'$ $9'$, and the guide-tracks $6^2$ $7^2$ $8^2$, the whole constructed and operating substantially as specified.

18. The combination of the shaft $d$, provided with the the arm $d'$, which supports the cord-holder and knife, and teeth 6 7 and 8 9, with the wheel F, provided with the teeth $6'$ $7'$ and $8'$ $9'$ and the delay or guide tracks $6^2$ $7^2$ $8^2$, the whole constructed and operating substantially as set forth.

19. The combination of the intermittently-oscillating cord-holder shaft, provided with its operating-teeth, with the knotter-shaft, provided with its pinions and means for operating them, for the purpose set forth.

20. The combination of the intermittently-oscillating shaft $d$, provided with the arm $d'$, and driving-teeth 6 7 and 8 9, and the knotter $a$, with its shaft $c$, and pinions $b$ $b^2$ and delay $b'$, with wheel F, having teeth $6'$ $7'$ and $8'$ $9'$ and delay-tracks $6^2$, $7^2$, and $8^2$, and gear-segments 1, 2, and 3, the whole constructed and operating substantially as set forth.

WILLIAM W. BURSON.

Witnesses:
J. F. STEWARD,
W. J. LUKENS.